(12) United States Patent
Wilson et al.

(10) Patent No.: US 11,794,285 B2
(45) Date of Patent: Oct. 24, 2023

(54) METHOD AND APPARATUS FOR WELDING AN ALUMINUM ALLOY

(71) Applicant: GM GLOBAL TECHNOLOGY OPERATIONS LLC, Detroit, MI (US)

(72) Inventors: Daniel J. Wilson, Linden, MI (US); Qigui Wang, Rochester Hills, MI (US); Liang Wang, Rochester Hills, MI (US); Huaxin Li, Rochester Hills, MI (US); Jason J. Coryell, Rochester Hills, MI (US); Joshua L. Solomon, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 17/387,278

(22) Filed: Jul. 28, 2021

(65) Prior Publication Data
US 2023/0030336 A1 Feb. 2, 2023

(51) Int. Cl.
*B23K 26/70* (2014.01)
*B23K 26/24* (2014.01)
*B23K 103/10* (2006.01)

(52) U.S. Cl.
CPC ............ *B23K 26/702* (2015.10); *B23K 26/24* (2013.01); *B23K 2103/10* (2018.08)

(58) Field of Classification Search
CPC ... B23K 2103/10; B23K 26/24; B23K 26/702
USPC .................................................... 219/121.63
See application file for complete search history.

(56) References Cited

U.S. PATENT DOCUMENTS

| | | | | |
|---|---|---|---|---|
| 2,971,079 A | * | 2/1961 | Sommeria | B23Q 15/24 33/23.08 |
| 3,101,404 A | * | 8/1963 | Hill | B23K 11/062 228/110.1 |
| 3,184,842 A | * | 5/1965 | Maropis | B23Q 5/027 228/1.1 |
| 3,305,157 A | * | 2/1967 | Pennings | B23K 20/106 228/1.1 |
| 4,588,873 A | * | 5/1986 | Fenn | B23K 9/0956 73/598 |
| 4,734,555 A | * | 3/1988 | Ferguson | B23K 11/253 219/110 |
| 5,057,182 A | * | 10/1991 | Wuchinich | B29C 65/08 156/580.2 |
| 6,078,125 A | * | 6/2000 | Roberts | B06B 3/02 228/1.1 |
| 6,605,178 B1 | * | 8/2003 | Shinohara | B29C 66/8145 156/580.2 |

(Continued)

*Primary Examiner* — Jimmy Chou
(74) *Attorney, Agent, or Firm* — Quinn IP Law (57) ABSTRACT

The concepts described herein provide a method, system, and apparatus for joining, via welding, first and second members fabricated from an aluminum alloy including aluminum, zinc, and manganese, such as 7000-series aluminum alloys, and a resultant workpiece. A junction is formed by a first member being disposed contiguously to a second member. A welding machine generates a weld pool at the junction that includes liquified aluminum alloy. An ultrasonic transducer directs ultrasonic energy in proximity to the weld pool. In some embodiments, an electro-magnetic transducer directs electro-magnetic energy in proximity to the weld pool. The first member is fused to the second member at the junction upon solidification of the weld pool.

13 Claims, 5 Drawing Sheets

(56) References Cited

U.S. PATENT DOCUMENTS

| | | | | |
|---|---|---|---|---|
| 6,743,331 | B2* | 6/2004 | Takahashi | B23K 20/106 156/580.2 |
| 10,525,634 | B2* | 1/2020 | Vila Noria | B29C 66/0342 |
| 2004/0245315 | A1* | 12/2004 | Maev | G01N 29/262 228/8 |
| 2005/0224477 | A1* | 10/2005 | McJunkin | B23K 26/044 219/124.34 |
| 2006/0076321 | A1* | 4/2006 | Maev | G01N 29/223 219/109 |
| 2007/0068907 | A1* | 3/2007 | Batzinger | G01N 29/4427 219/109 |
| 2009/0090700 | A1* | 4/2009 | Sato | B23K 28/02 228/110.1 |
| 2011/0284508 | A1* | 11/2011 | Miura | B23K 31/125 219/121.64 |
| 2014/0255620 | A1* | 9/2014 | Shuck | B23K 26/702 219/121.45 |
| 2016/0001400 | A1* | 1/2016 | Saenger | E21B 43/1195 219/121.64 |
| 2023/0125688 | A1* | 4/2023 | Wang | G01S 15/8925 73/596 |

\* cited by examiner

METHOD AND APPARATUS FOR WELDING AN ALUMINUM ALLOY

INTRODUCTION

Welding is a fabrication process that joins materials of two or more members of a workpiece by using heat to melt the materials, which intermingle, thus fusing the members upon cooling and solidification. The result may be referred to as a fusion weld joint. In some instances, the materials of the members are supplemented by filler material that may be the same or similar to the materials of the members, thus forming a nearly homogenous weld.

One form of welding is laser welding, which is a metal joining process in which a laser beam is directed at a junction of two or more metal members to provide a concentrated energy source capable of generating a fusion weld joint between the metal members. The metal members may be stacked, abutted, or otherwise aligned relative to one another within an intended weld site. A laser beam is then directed at or near a top surface of the members. The heat generated from the absorption of energy that is supplied by the laser beam initiates melting of the members and generates a molten weld pool that can intermingle the materials of the members.

Welding of some aluminum alloys can be difficult to achieve due to non-equivalent cooling and solute segregation effects of added elements, e.g., zinc, in a weld pool during solidification. By way of example, welding of aluminum alloys containing aluminum, zinc, manganese, and often silicon may be prone to cracking during solidification of the weld pool after heating. One example of aluminum alloys containing aluminum (Al), zinc (Zn), and manganese (Mg) is 7000-series aluminum alloys.

During solidification of a weld pool, the liquid composition shifts towards a Zn—Al binary eutectic that may form at a grain boundary due to non-equilibrium cooling and solute segregation effects. A weld crack may be generated at a grain boundary due to segregation of the zinc, which may be caused by differences in solidification temperatures of the various alloys and non-equilibrium solidification conditions. Furthermore, certain metal phases, e.g., $MgZn2$ and $Mg2Si$, are known to solidify in the final 10% of solidification, which may significantly reduce hot-tearing resistance of the alloy at the joint.

SUMMARY

The concepts described herein provide a method, system, and apparatus for joining, via welding, first and second members fabricated from an aluminum alloy including aluminum, zinc, and manganese. In one embodiment, the aluminum alloy includes a 7000-series aluminum alloy. The concepts also describe a workpiece that is created by welding two members that are fabricated from an aluminum alloy including aluminum, zinc, and manganese employing the method, system, and apparatus for joining that is described herein.

The apparatus for joining the first and second members includes a welding machine and an ultrasonic transducer. A junction is formed by the first member being disposed contiguously to the second member. The welding machine generates a weld pool at the junction. The weld pool contains liquified aluminum alloy from the first member and liquified aluminum alloy from the second member. The ultrasonic transducer directs ultrasonic energy in proximity to the junction. The liquified aluminum alloy from the first member is intermingled with the liquified aluminum alloy from the second member. The first member is fused to the second member at the junction upon solidification of the weld pool.

An aspect of the disclosure includes the welding machine being a laser welder that is capable of directing a laser beam to the junction to generate the weld pool.

Another aspect of the disclosure includes the ultrasonic transducer directing ultrasonic energy to the weld pool to intermingle the liquified aluminum alloy from the first member and the liquified aluminum alloy from the second member at the junction.

Another aspect of the disclosure includes the ultrasonic transducer having a sonotrode, wherein the sonotrode is inserted into the weld pool to direct ultrasonic energy into the weld pool at the junction.

Another aspect of the disclosure includes the sonotrode being in physical contact with one of the first member or the second member in proximity to the weld pool to direct ultrasonic energy thereto.

Another aspect of the disclosure includes an electro-magnetic transducer that includes a magnetic induction circuit having a first pole and a second pole, wherein the electro-magnetic transducer directs electro-magnetic energy in proximity to the weld pool formed at the junction.

Another aspect of the disclosure includes the electro-magnetic transducer directing electro-magnetic energy to the weld pool to intermingle the liquified aluminum alloy from the first member and the liquified aluminum alloy from the second member at the junction.

Another aspect of the disclosure includes the electro-magnetic transducer directing electro-magnetic energy to the weld pool to intermingle the liquified aluminum alloy from the first member and the liquified aluminum alloy from the second member at the junction.

Another aspect of the disclosure includes the first pole and the second pole of the electro-magnetic transducer being arranged to apply an electro-magnetic field perpendicular to the junction and adjacent to the weld pool.

Another aspect of the disclosure includes the first pole of the electro-magnetic transducer being proximal to the first member and adjacent to the weld pool, and the second pole of the electro-magnetic transducer being proximal to the second member and adjacent to the weld pool.

Another aspect of the disclosure includes the first pole and the second pole of the electro-magnetic transducer being arranged to apply an electro-magnetic field parallel to the junction and adjacent to the weld pool.

Another aspect of the disclosure includes the first pole of the electro-magnetic transducer being proximal to a top portion of the first member and adjacent to the weld pool, and the second pole of the electro-magnetic transducer being proximal to a bottom portion of the first member and adjacent to the weld pool.

Another aspect of the disclosure includes the first pole of the electro-magnetic transducer being disposed on the first member and adjacent to the weld pool, and the second pole of the electro-magnetic transducer being disposed on the second member and adjacent to the weld pool.

Another aspect of the disclosure includes the first pole and the second pole of the electro-magnetic transducer being arranged to apply an electro-magnetic field perpendicular to the junction and adjacent to the weld pool.

Another aspect of the disclosure includes the first pole of the electro-magnetic transducer being disposed on a top portion of the first member and adjacent to the weld pool, and the second pole of the electro-magnetic transducer being disposed on a bottom portion of the first member and adjacent to the weld pool.

Another aspect of the disclosure includes the first pole and the second pole of the electro-magnetic transducer being arranged to apply an electro-magnetic field parallel to the junction and adjacent to the weld pool.

Another aspect of the disclosure includes the junction formed by the first member and the second member being one of a butt joint, a lap joint, a tee joint, a corner joint, or an edge joint.

Another aspect of the disclosure includes the laser welder and the ultrasonic transducer generating a seam weld at the junction of the first and second members.

Another aspect of the disclosure includes the laser welder and the ultrasonic transducer generating a spot weld at the junction of the first and second members.

Another aspect of the disclosure includes the aluminum alloy including aluminum, zinc, and manganese being a 7000-series aluminum alloy.

Another aspect of the disclosure includes an apparatus that includes a first member fabricated from an aluminum alloy including aluminum, zinc, and manganese; a second member fabricated from the aluminum alloy including aluminum, zinc, and manganese; and a weld joint that includes aluminum alloy from the first member intermingled with aluminum alloy from the second member. The weld joint is formed via a fusion welding process. The fusion welding process includes directing, via a laser welder, a laser beam onto a junction formed by the first member and the second member to form a weld pool. An ultrasonic transducer directs ultrasonic energy in proximity to the weld pool.

Another aspect of the disclosure includes directing, via an electro-magnetic transducer, electro-magnetic energy in proximity to the weld pool.

Another aspect of the disclosure includes a method for joining first and second members, wherein the first and second members are fabricated from an aluminum alloy that includes aluminum, zinc, and manganese. The method includes directing, via a laser welder, a laser beam onto a junction formed by the first member and the second member to generate a weld pool. An ultrasonic transducer directs ultrasonic energy into the weld pool. The weld pool is composed of intermingled materials from the first and second members.

Another aspect of the disclosure includes directing, via an electro-magnetic transducer that includes a magnetic induction circuit, electro-magnetic energy to the weld pool.

Another aspect of the disclosure includes directing, via the ultrasonic transducer, the ultrasonic energy into the weld pool by inserting the ultrasonic transducer into the weld pool.

Another aspect of the disclosure includes directing, via the ultrasonic transducer, the ultrasonic energy into the weld pool formed by placing the ultrasonic transducer onto one of the first and second members in proximity to the weld pool.

The concepts described herein serve to reduce or eliminate segregation effects within the microstructure of the aluminum alloy material during welding, thus minimizing or avoiding occurrence of weld cracks, reducing weld porosity, and otherwise improving mechanical properties of the workpiece.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be employed to assist in describing the drawings. These and similar directional terms are illustrative, and are not to be construed to limit the scope of the disclosure. Furthermore, the disclosure, as illustrated and described herein, may be practiced in the absence of an element that is not specifically disclosed herein.

Referring to the drawings, wherein like reference numerals correspond to like or similar components throughout the several Figures, FIGS. 1A, 1B, 2A, 2B, 3A, 3B, 4A and 4B schematically illustrate embodiments related to a welding method, welding apparatus, and a welding system 100 for joining first and second members 11, 21, respectively, of a workpiece 10, wherein the first and second members 11, 21 are fabricated from an aluminum alloy that includes aluminum, zinc, and manganese. In one embodiment, the aluminum alloy that includes aluminum, zinc, and manganese is a 7000-series aluminum alloy. Each of the drawings is depicted in context of a lateral axis (X), a longitudinal axis (Y), and an elevation axis (Z).

The first member 11 includes an edge portion 12, a top portion 14, and a bottom portion 16, and the second member 21 includes an edge portion 22, a top portion 24, and a bottom portion 26. A junction 15 is created between the first and second members 11, 21, and a weld joint 28 is generated at the junction 15. The junction 15 that is formed by joining the first member 11 and the second member 21 may be a butt joint, a lap joint, a tee joint, a corner joint, or an edge joint. The junction 15 may be at or near one or both the edge portion 12 of the first member 11 and the edge portion 22 of the second member 21. The weld joint 28 formed at the junction 15 of the first and second members 11, 21 by the welding system 100 is a fusion weld joint. A fillet material that is fabricated from the aluminum alloy that includes aluminum, zinc, and manganese may be dispensed by a feeder (not shown) of the welding system 100 during the forming of the weld joint 28.

The welding system 100 includes a welding machine 30, one or multiple ultrasonic transducers 40, and, in one embodiment, one or multiple electro-magnetic transducers 50.

The welding machine 30 is a laser welder 31 that forms a weld pool 25 to fuse the first and second members 11, 21 at the junction 15 in one embodiment. Alternatively, the welding machine 30 may be another heat generating device that is capable of generating sufficient heat to liquefy at least portions of the materials of the first and second members 11, 21 at the junction 15 to form the weld pool 25. The weld pool 25 contains liquified portions of the materials of the first and second members 11, 21. The liquified portions of the materials of the first and second members 11, 21 are intermingled by operation of the welding system 100. Non-limiting examples of alternate embodiments of the welding machine 30 include oxy-acetylene welders, stark gas welders, etc.

The laser welder 31 is a solid-state device that generates, focuses and directs a laser beam 32, including being advantageously disposed to direct the laser beam 32 at a top surface of the workpiece 10 at the junction 15 of the first member 11 and the second member 21. Operation of the laser welder 31 is controlled by laser controller 38. In one embodiment, the laser welder 31 may be mounted to a robotic arm (not shown) to move the laser welder 31 to form the weld joint 28 in response to programmed inputs to the laser controller 38. The laser beam 32 is a solid-state laser beam and, in particular, a fiber laser beam or a disk laser beam operating with a wavelength in the near-infrared range, i.e., wavelengths in a range between 700 nm to 2900 nm of the electromagnetic spectrum. In one embodiment, the laser beam 32 may be an optical fiber doped with rare-earth elements (e.g., erbium, ytterbium, neodymium, dysprosium, praseodymium, thulium, etc.) or a semiconductor associated with a fiber resonator. Alternatively, a disk laser beam may be employed, which includes a laser beam in which the gain medium is a thin disk of ytterbium-doped yttrium-aluminum garnet crystal that is coated with a reflective surface and mounted to a heat sink.

The welding system 100 may also include, in one embodiment, a clamping mechanism (not shown) that is advantageously arranged to apply compressive force to the workpiece 10 to mechanically clamp and thus hold the first and second members 11, 21 of the workpiece 10 in position to effect fusion welding with the laser welder 31.

As shown, the laser beam 32 impinges on the top surface of the workpiece 10 and imparts localized heat energy to generate the weld pool 25 from the materials of the first and second members 11, 21, and thus form the weld joint 28 upon cooling to effect fusion welding. In one embodiment, the laser beam 32 may be controlled to a defocusing distance or focal point that may be adjusted based upon physical properties of the selected aluminum alloy materials for the workpiece 10 to be welded by the laser welder 31. In one embodiment, the laser beam 32 rapidly generates the molten weld pool 25 upon impinging the top surface of the workpiece 10.

After the molten weld pool 25 is formed and stable, the laser beam 32 is advanced along the top surface 14 of the workpiece 10 while tracking a predetermined weld path 60. Such advancement of the laser beam translates the molten weld pool along a corresponding course relative to the top surface of the workpiece stack and leaves behind molten workpiece material in the wake of the advancing weld pool that includes material from the layers of the metal workpieces in the workpiece stack. This penetrating molten workpiece material cools and solidifies to form a weld joint that is composed of re-solidified materials from all the layers of the workpiece. Such fusion of the material from the overlapping or abutted layers of the workpiece forms a weld joint.

The welding system 100 also includes the ultrasonic transducer 40. The ultrasonic transducer 40 operates in an ultrasonic frequency range, although other vibration frequency ranges may be employed without departing from the intended scope of the concepts described herein.

The ultrasonic transducer 40 includes a sonotrode 42 having a tip 44, a piezoelectric stack 46, and a booster 45. The piezoelectric stack 46 couples via the booster 45 to the tip 44, and is operatively connected to a sonotrode controller 48. The piezoelectric stack 46 is a vibrational energy input device. The sonotrode 42 may be vibrated by activation of the piezoelectric stack 46 in response to a sinusoidal or another repetitive oscillating signal that is provided from the sonotrode controller 48. Piezoelectric materials are electromechanical materials that transform energy between mechanical and electric domains. Piezoelectric materials may be crystalline structures or ceramics that produce an output voltage signal in response to a mechanical stress. This effect also occurs in the reverse manner, i.e., a mechanical displacement or strain is induced in response to a fixed or oscillating voltage input that is applied to a sample piezoelectric material. For example, activation of a given piezoelectric material may result in a change in dimension of approximately 0.1% for piezo-ceramics and approximately 41% for piezo-polymers. As such, the piezoelectric stack 46 may vibrate in response to the repetitive oscillating signal provided from the sonotrode controller 48, and the vibration may be propagated through the booster 45 to the tip 44 of the sonotrode 42 to induce vibration in the workpiece 10. The direction of the induced vibration is indicated by arrow 49.

In one embodiment, the tip 44 is in the form of a welding pad that is arranged to contact a solid portion of the workpiece 10, e.g., the top portion 14 of the first member 11 as shown. The tip 44 may have a knurled surface that includes raised bumps or ridges, or another surface configuration. The surface of the tip 44 physically contacts the top portion 14 of the first member 11 or the top portion 24 of the second member 21 of the workpiece 10 during the vibration process. Alternatively, the tip 44 of the sonotrode 42 may contact the workpiece 10 on a side portion, an end portion, a bottom portion, or at another available location.

Alternatively, the tip 44 is in the form of a pin, a spatula, a spoon, etc. The tip 44 is arranged to be inserted into and immersed in the molten weld pool 25 that is formed in the workpiece 10 by the laser welder 31. The surface of the tip 44 vibrates in the molten weld pool 25 during the vibration process.

In operation, the sonotrode 42 of the ultrasonic transducer 40 is controlled to induce vibration in the workpiece 10 via the tip 44 either proximal to the molten weld pool 25 or while being immersed in the molten weld pool 25 when the laser beam 32 has generated the molten weld pool 25.

The welding system 100 includes, in one embodiment, the electro-magnetic transducer 50, which is arranged to induce an electro-magnetic field on a portion of the workpiece 10 that includes the weld pool 25 during the welding process. The electro-magnetic transducer 50 includes an electrical induction circuit 51 that is electrically connected to an induction controller 58 having a first localized electro-magnetic pole 53 and a second localized electro-magnetic pole 54. The first localized electro-magnetic pole 53 may be defined as a north (N) pole, and the second localized electro-magnetic pole 54 may be defined as a south (S) pole.

As the laser beam 32 of the laser welder 31 generates the molten weld pool 25, the electro-magnetic transducer 50 is controlled to induce electro-magnetic energy in the workpiece 10 proximal to the molten weld pool 25. Stated differently, the electro-magnetic transducer 50 directs electro-magnetic energy in proximity to the weld pool 25 that is formed at the junction 15 by operation of the laser welder 31, e.g., within 10 mm in one embodiment. The electro-magnetic energy may be generated and delivered at a frequency of 1-8 KHz, with a power source of 110-380 VAC and heating power of 1-10 kW in one embodiment.

Referring again to FIGS. 1A and 1B, one embodiment of the laser welding system 100 is graphically illustrated from a front side view (FIG. 1A) and a corresponding top view (FIG. 1B), with the weld joint 28 and weld path 60 indicated. In this embodiment, the workpiece 10 includes the first and second members 11, 21 arranged with the junction 15 being formed by abutment of respective first and second edge portions 12, 22. The welding machine 30, i.e., the laser welder 31 in one embodiment, is arranged overtop of the workpiece 10 and is controllable to follow the weld path 60 along the junction 15 during the welding process. In operation, the welding machine 30 generates the weld pool 25 at the junction 15 between the first and second members 11, 21. The welding machine 30 operates to generate a continuous seam weld along the weld path 60 in one embodiment. Alternatively, the welding machine 30 operates to generate a plurality of spot welds along the weld path 60 in one embodiment.

Figure 1A:
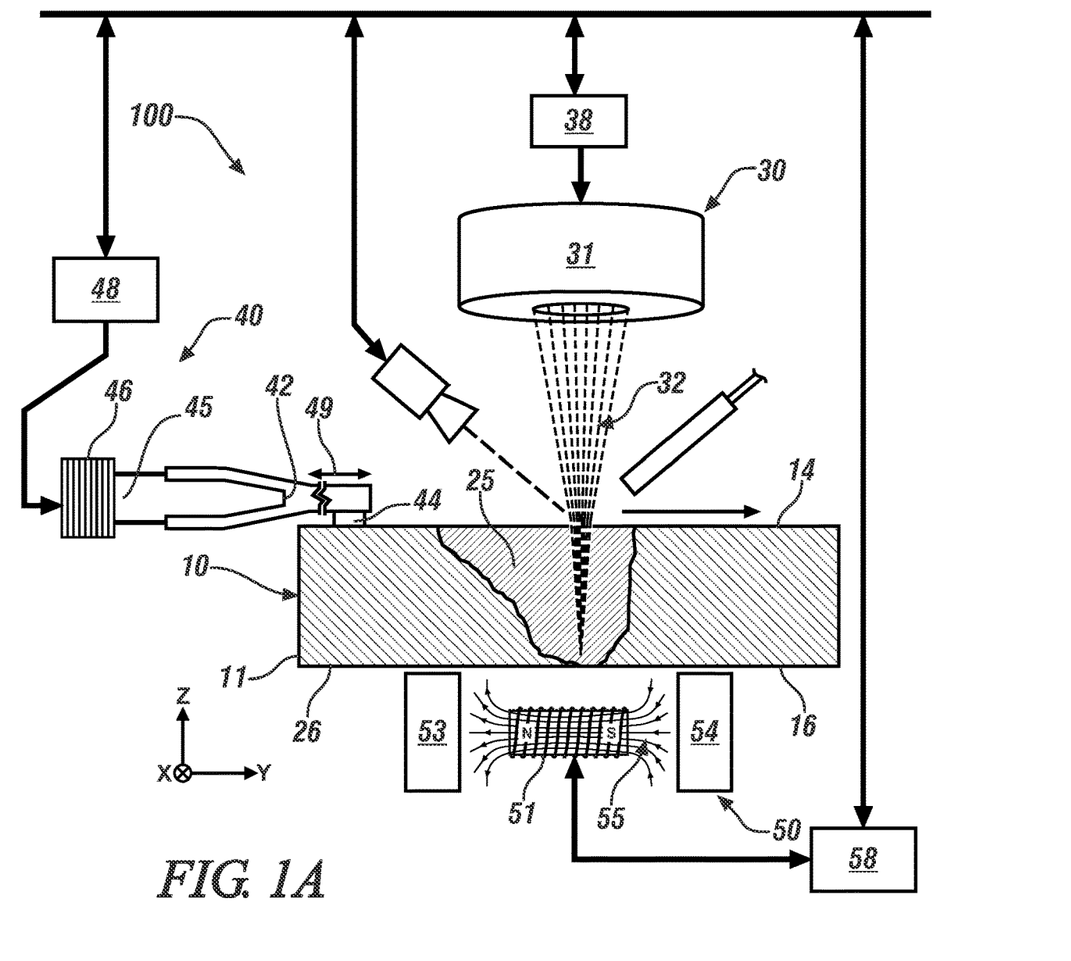
FIG. 1A schematically shows a side-view of an embodiment of a welding system for joining a first member and a second member of a workpiece, wherein the first and second members are fabricated from an aluminum alloy that includes aluminum, zinc, and manganese, in accordance with the disclosure.
Figure 1B:
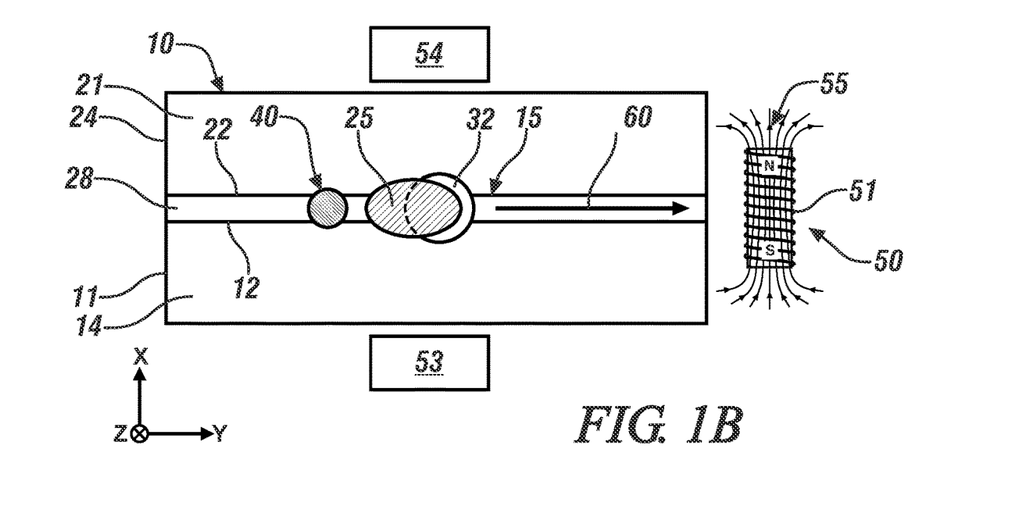
FIG. 1B schematically shows a top-view of the embodiment of the welding system for joining the first member and the second member of the workpiece, in accordance with the disclosure.

The ultrasonic transducer 40 is arranged with the tip 44 of the sonotrode 42 being in contact with one of or both of the top portion 14 of the first member 11 and the top portion 24 of the second member 21, at or near the junction 15. In this embodiment, the tip 44 of the sonotrode 42 is in contact with the junction 15 proximal to the weld pool 25, but is not in contact with the liquified material of the weld pool 25. In one embodiment, being proximal to the weld pool 25 means that the tip 44 is located less than 10 mm away from the weld pool 25. In operation, the ultrasonic transducer 40 generates vibration energy that is transferred by the tip 44 to the workpiece 10 during the operation of the welding machine 30. Specifically, the vibration energy is transferred by the tip 44 to the liquified material in the weld pool 25 via the solidified or non-liquified portion(s) of the first and/or second members 11, 21. In one embodiment, the vibration energy has an order of magnitude of between 15 kHz and 40 kHz with an acoustic intensity of 10-100 W/cm2 at 50-100% amplitude.

The electro-magnetic transducer 50 is arranged with the induction circuit 51 and the first and second localized poles 53, 54 disposed either beneath or beside the workpiece 10 at the point where the weld pool 25 is generated by the welding machine 30. Operation of the induction circuit 51 is controlled by an induction controller 58. The induction circuit 51 and the first and second localized poles 53, 54 are arranged to generate electro-magnetic radiation 55 that is transverse to the weld path 60 during the operation of the induction circuit 51 to act upon the liquified material in the weld pool 25. The electro-magnetic radiation 55 employs sinusoidal low frequency electro-magnetic radiation, with a wavelength that is in the order of magnitude between 1 and 200 mm in one embodiment.

Referring again to FIGS. 2A and 2B, another embodiment of the laser welding system 100 is graphically illustrated from a front side view (FIG. 2A) and a corresponding top view (FIG. 2B), with the weld joint 28 and weld path 60 indicated. In this embodiment, the workpiece 10 includes the first and second members 11, 21 arranged with the junction 15 being formed by abutment of respective first and second edge portions 12, 22. The welding machine 30, i.e., the laser welder 31 in one embodiment, is arranged overtop of the workpiece 10 and is controllable to follow the weld path 60 along the junction 15 during the welding process. In operation, the welding machine 30 generates the weld pool 25 at the junction 15 between the first and second members 11, 21. The welding machine 30 operates to generate a continuous seam weld along the weld path 60 in one embodiment. Alternatively, the welding machine 30 operates to generate a plurality of spot welds along the weld path 60 in one embodiment.

Figure 2A:
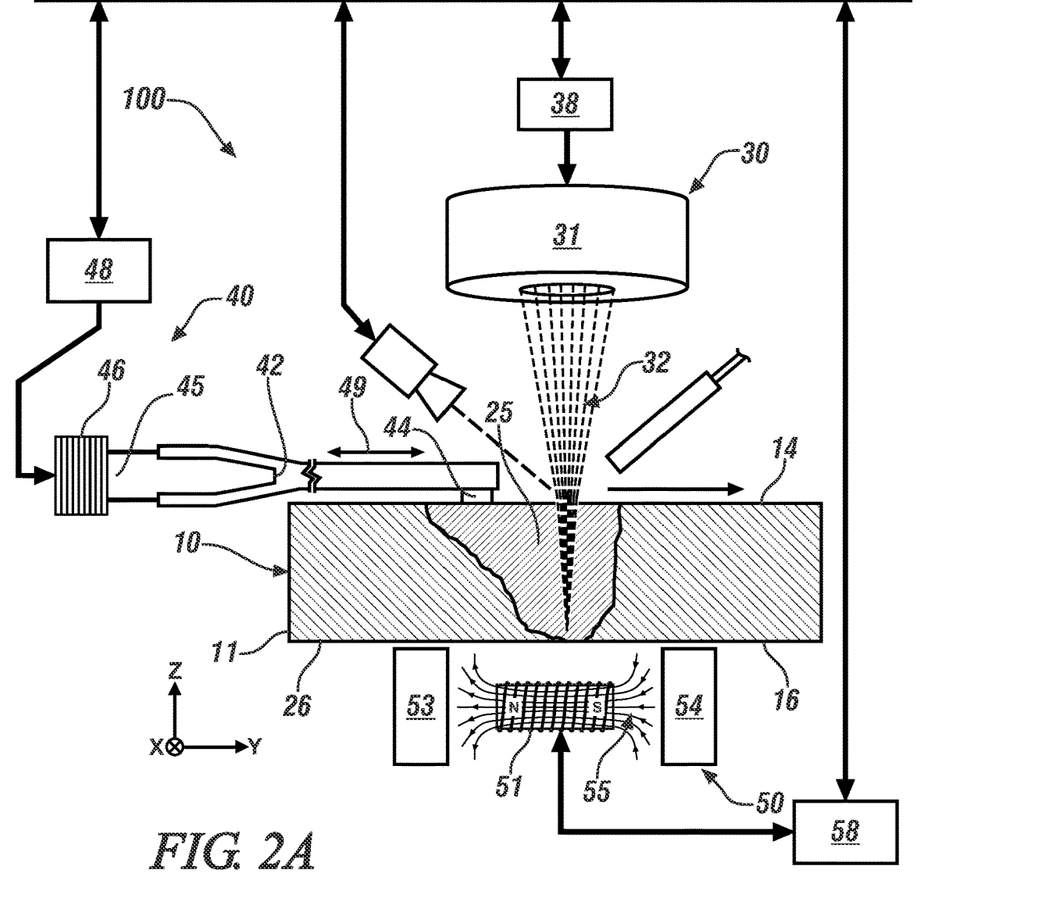
FIG. 2A schematically shows a side-view of another embodiment of a welding system for joining a first member and a second member of a workpiece, wherein the first and second members are fabricated from an aluminum alloy that includes aluminum, zinc, and manganese, in accordance with the disclosure.
Figure 2B:
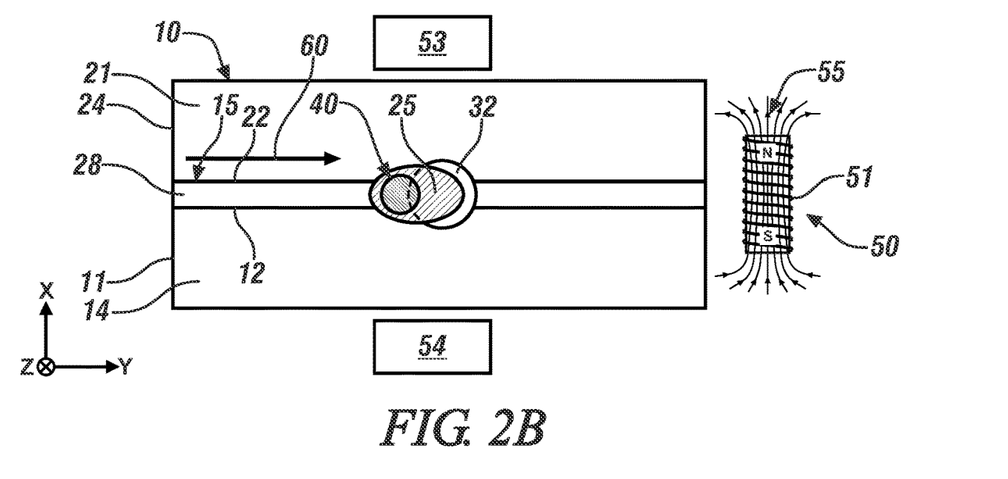
FIG. 2B schematically shows a top-view of the embodiment of the welding system shown in FIG. 2A for joining the first member and the second member of the workpiece, in accordance with the disclosure.

The ultrasonic transducer 40 is arranged with the tip 44 of the sonotrode 42 being in contact with one of or both of the top portion 14 of the first member 11 and the top portion 24 of the second member 21, at or near the junction 15. In this embodiment, the tip 44 of the sonotrode 42 is immersed in the liquified material of the weld pool 25. In operation, the ultrasonic transducer 40 generates vibration energy that is transferred by the tip 44 to the weld pool 25 of the workpiece 10 during the operation of the welding machine 30. Specifically, the vibration energy is transferred by the tip 44 directly into the liquified material in the weld pool 25 via the solidified or non-liquified portion(s) of the first and/or second members 11, 21. In one embodiment, the vibration energy has an order of magnitude of between 15 kHz and 40 kHz with an acoustic intensity of 10-100 W/cm2 at 50-100% amplitude.

The electro-magnetic transducer 50 is arranged with the induction circuit 51 and the first and second localized poles 53, 54 disposed either beneath or beside the workpiece 10 at the point where the weld pool 25 is generated by the welding machine 30. Operation of the induction circuit 51 is controlled by an induction controller 58. The induction circuit 51 and the first and second localized poles 53, 54 are arranged to generate electro-magnetic radiation 55 that is transverse to the weld path 60 during the operation of the induction circuit 51 to act upon the liquified material in the weld pool 25. The electro-magnetic radiation 55 employs sinusoidal low frequency electro-magnetic radiation, with a wavelength that is in the order of magnitude of 1-200 mm in one embodiment.

Referring again to FIGS. 3A and 3B, one embodiment of the laser welding system 100 is graphically illustrated from a front side view (FIG. 3A) and a corresponding top view (FIG. 3B), with the weld joint 28 and weld path 60 indicated. In this embodiment, the workpiece 10 includes the first and second members 11, 21 arranged with the junction 15 being formed by abutment of respective first and second edge portions 12, 22. The welding machine 30, i.e., the laser welder 31 in one embodiment, is arranged overtop of the workpiece 10 and is controllable to follow the weld path 60 along the junction 15 during the welding process. In operation, the welding machine 30 generates the weld pool 25 at the junction 15 between the first and second members 11, 21. The welding machine 30 operates to generate a continuous seam weld along the weld path 60 in one embodiment. Alternatively, the welding machine 30 operates to generate a plurality of spot welds along the weld path 60 in one embodiment.

Figure 3A:
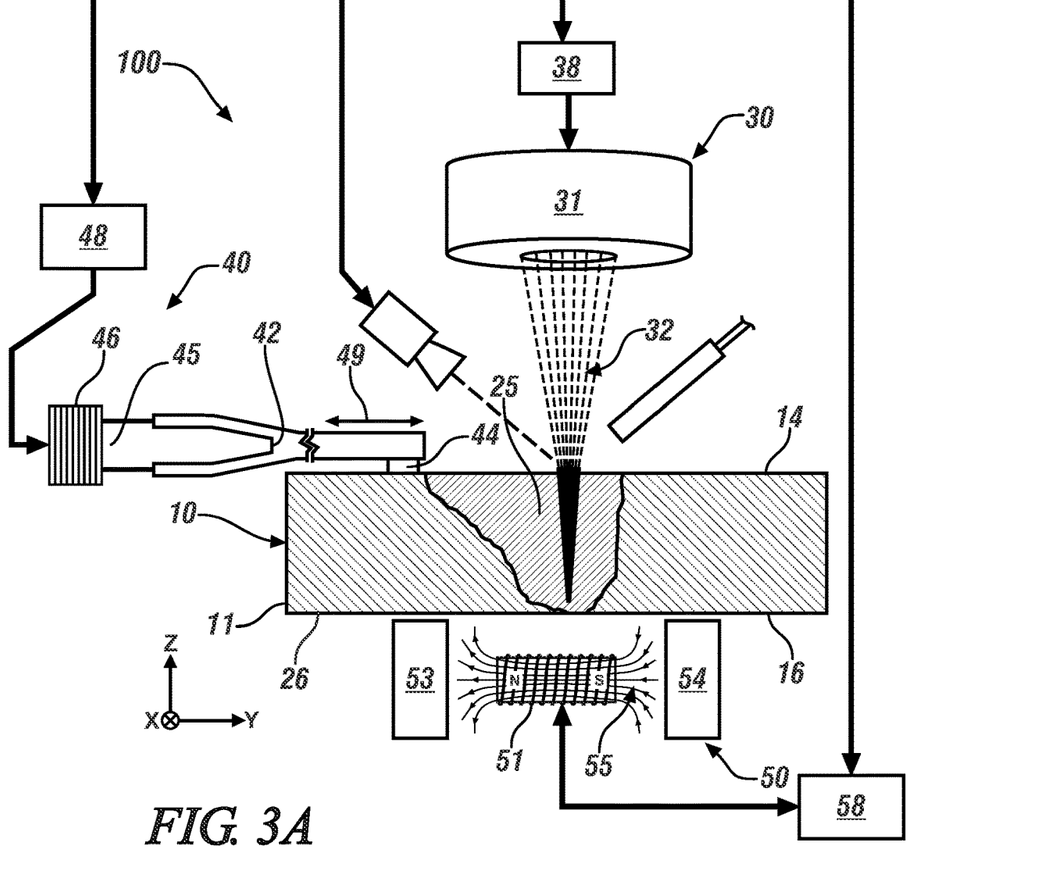
FIG. 3A schematically shows a side-view of another embodiment of a welding system for joining a first member and a second member of a workpiece, wherein the first and second members are fabricated from an aluminum alloy that includes aluminum, zinc, and manganese, in accordance with the disclosure.
Figure 3B:
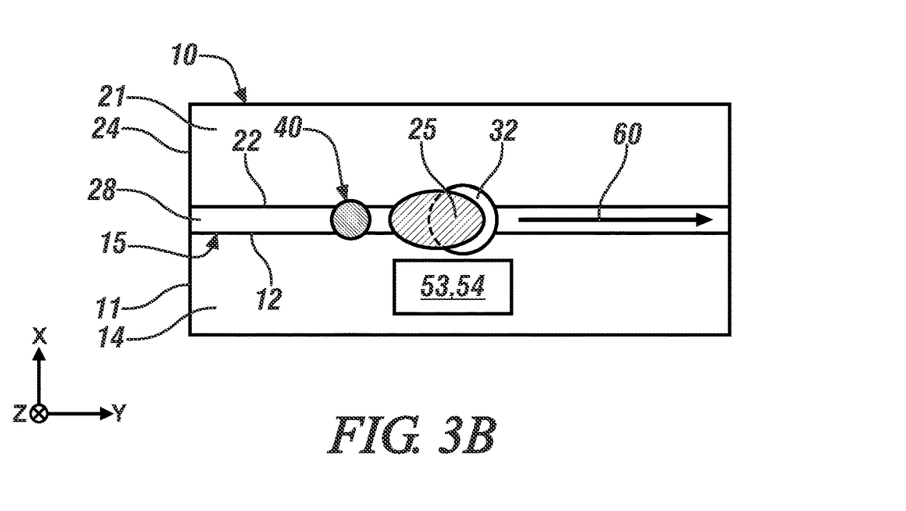
FIG. 3B schematically shows a top-view of the embodiment of the welding system shown in FIG. 3A for joining the first member and the second member of the workpiece, in accordance with the disclosure.

The ultrasonic transducer 40 is arranged with the tip 44 of the sonotrode 42 being in contact with one of or both of the top portion 14 of the first member 11 and the top portion 24 of the second member 21, at or near the junction 15. In this embodiment, the tip 44 of the sonotrode 42 is in contact with the junction 15 proximal to the weld pool 25, but is not in contact with the liquified material of the weld pool 25. In one embodiment, being proximal to the weld pool 25 means that the tip 44 is less than 10 mm away from the weld pool 25. In operation, the ultrasonic transducer 40 generates vibration energy that is transferred by the tip 44 to the workpiece 10 during the operation of the welding machine 30. Specifically, the vibration energy is transferred by the tip 44 to the liquified material in the weld pool 25 via the solidified or non-liquified portion(s) of the first and/or second members 11, 21. In one embodiment, the vibration energy has an order of magnitude of between 15 kHz and 40 kHz with an acoustic intensity of 10-100 W/cm2 at 50-100% amplitude.

The electro-magnetic transducer 50 is arranged with the induction circuit 51 arranged in a vertical orientation beside the workpiece 10 with the first localized pole 53 disposed overtop of the workpiece 10 and the second localized pole 54 disposed beneath the workpiece 10 at the point where the weld pool 25 is generated by the welding machine 30. Operation of the induction circuit 51 is controlled by an induction controller 58. The induction circuit 51 and the first and second localized poles 53, 54 are arranged to generate electro-magnetic radiation 55 that is parallel to the weld path 60 during the operation of the induction circuit 51 to act upon the liquified material in the weld pool 25. The electro-magnetic radiation 55 employs sinusoidal low frequency electro-magnetic radiation, with a wavelength that is in the order of magnitude of 1-200 mm in one embodiment.

Referring again to FIGS. 4A and 4B, another embodiment of the laser welding system 100 is graphically illustrated from a front side view (FIG. 4A) and a corresponding top view (FIG. 4B), with the weld joint 28 and weld path 60 indicated. In this embodiment, the workpiece 10 includes the first and second members 11, 21 arranged with the junction 15 being formed by abutment of respective first and second edge portions 12, 22. The welding machine 30, i.e., the laser welder 31 in one embodiment, is arranged overtop of the workpiece 10 and is controllable to follow the weld path 60 along the junction 15 during the welding process. In operation, the welding machine 30 generates the weld pool 25 at the junction 15 between the first and second members 11, 21. The welding machine 30 operates to generate a continuous seam weld along the weld path 60 in one embodiment. Alternatively, the welding machine 30 operates to generate a plurality of spot welds along the weld path 60 in one embodiment.

Figure 4A:
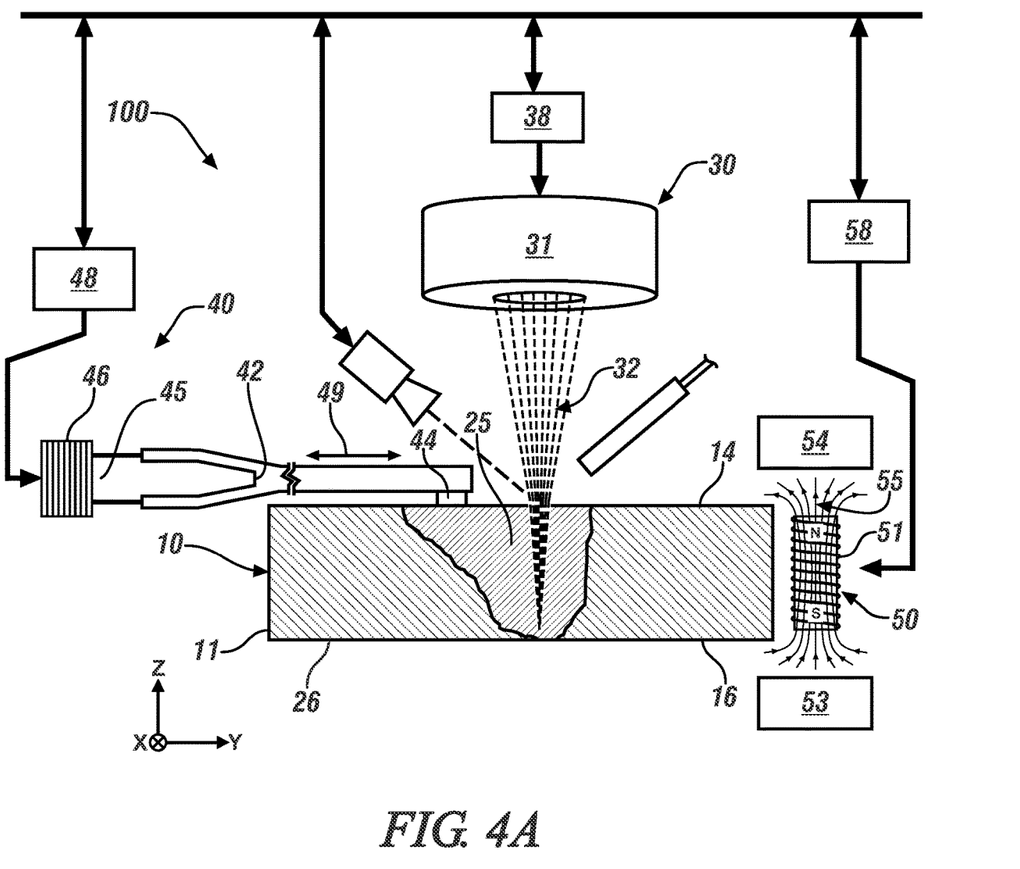
FIG. 4A schematically shows a side-view of another embodiment of a welding system for joining a first member and a second member of a workpiece, wherein the first and second members are fabricated from an aluminum alloy that includes aluminum, zinc, and manganese, in accordance with the disclosure.
Figure 4B:
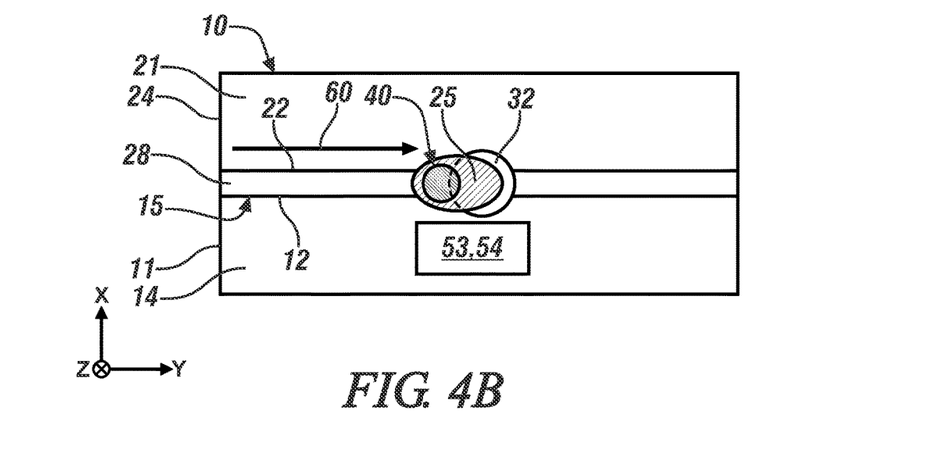
FIG. 4B schematically shows a top-view of the embodiment of the welding system shown in FIG. 4A for joining the first member and the second member of the workpiece, in accordance with the disclosure.

The ultrasonic transducer 40 is arranged with the tip 44 of the sonotrode 42 being in contact with one of or both of the top portion 14 of the first member 11 and the top portion 24 of the second member 21, at or near the junction 15. In this embodiment, the tip 44 of the sonotrode 42 is inserted into and in contact with the liquified material of the weld pool 25. In operation, the ultrasonic transducer 40 generates vibration energy that is transferred by the tip 44 to the weld pool 25 of the workpiece 10 during the operation of the welding machine 30. Specifically, the vibration energy is transferred by the tip 44 directly into the liquified material in the weld pool 25 via the solidified or non-liquified portion(s) of the first and/or second members 11, 21. In one embodiment, the vibration energy has an order of magnitude of between 15 kHz and 40 kHz with an acoustic intensity of 10-100 W/cm2 at 50-100% amplitude.

The electro-magnetic transducer 50 is arranged with the induction circuit 51 arranged in a vertical orientation beside the workpiece 10 with the first localized pole 53 disposed overtop of the workpiece 10 and the second localized pole 54 disposed beneath the workpiece 10 at the point where the weld pool 25 is generated by the welding machine 30. Operation of the induction circuit 51 is controlled by an induction controller 58. The induction circuit 51 and the first and second localized poles 53, 54 are arranged to generate electro-magnetic radiation 55 that is parallel to the weld path 60 during the operation of the induction circuit 51 to act upon the liquified material in the weld pool 25. The electro-magnetic radiation 55 employs sinusoidal low frequency electro-magnetic radiation, with a wavelength that is in the order of magnitude of 1 to 200 mm in one embodiment.

Figure 5:
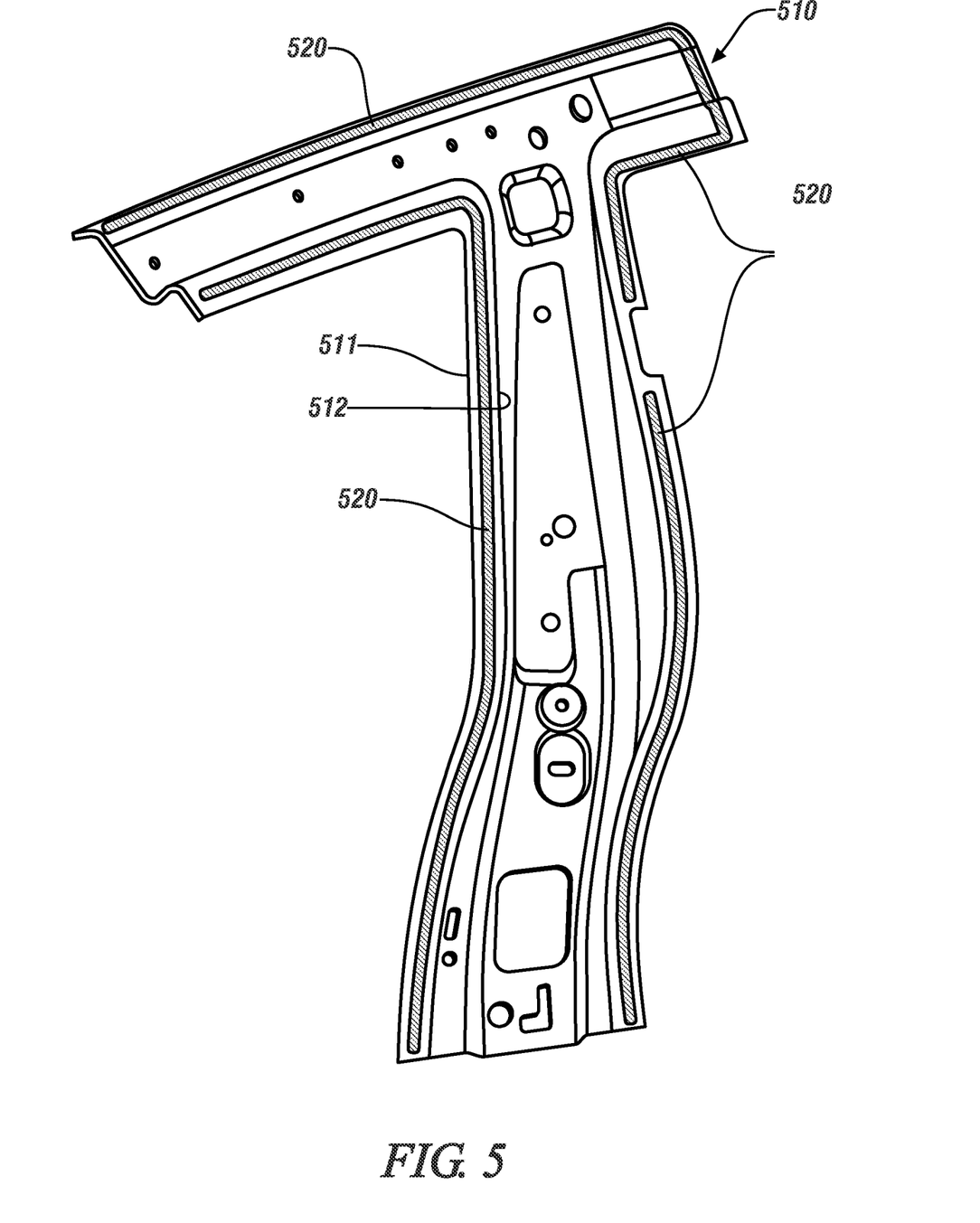
FIG. 5 pictorially illustrates an embodiment of a workpiece including first and second members having seam welds fabricated thereon, in accordance with the disclosure.

FIG. 5 schematically illustrates an embodiment of a workpiece 510 that has been fabricated employing an embodiment of the welding system 100 described herein. The workpiece 510 includes a plurality of weld seams 520 that join first and second members 511, 512, respectively, wherein the first and second members 511, 512 are fabricated from an aluminum alloy that includes aluminum, zinc, and manganese. In one embodiment, the aluminum alloy that includes aluminum, zinc, and manganese is a 7000-series aluminum alloy.

The concepts described herein provide a welding process and system that includes heat welding with assistance from integrated ultrasonic and/or electromagnetic processes and devices. The welding process and system provide a feasible system for welding workpieces fabricated from 7000-series aluminum alloys while eliminating material segregating and thus avoiding cracking at the weld joint by refining microstructures. This serves to reduce weld defects. The process may also eliminate a need for filler metal and improve the mechanical properties of the workpiece.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An apparatus for joining comprising:
a first member and a second member each fabricated from an aluminum alloy that includes aluminum, zinc, and manganese;
wherein a junction is defined by the first member being disposed contiguously to the second member;
a welding machine;
an ultrasonic transducer; and
an electro-magnetic transducer that includes a magnetic induction circuit having a first pole and a second pole;
wherein the welding machine generates a weld pool at the junction that contains liquified aluminum alloy from the first member and liquified aluminum alloy from the second member;
wherein the ultrasonic transducer directs ultrasonic vibration energy having a frequency of from 15 kHz to 40 kHz and an acoustic intensity of from 10 W/cm$^2$ to 100 W/cm$^2$ and from 50% amplitude to 100% amplitude in proximity to the weld pool at the junction;
wherein the electro-magnetic transducer directs sinusoidal low frequency electro-magnetic energy having a wavelength of from 1 mm to 200 mm in proximity to the weld pool formed at the junction; and
wherein the first member is fused to the second member at the junction upon solidification of the weld pool.

2. The apparatus of claim 1, wherein the welding machine comprises a laser welder; and
wherein the laser welder directs a laser beam to the junction to generate the weld pool.

3. The apparatus of claim 1, wherein the ultrasonic transducer directs ultrasonic energy to the weld pool to intermingle the liquified aluminum alloy from the first member and the liquified aluminum alloy from the second member at the junction.

4. The apparatus of claim 3, further comprising the ultrasonic transducer having a sonotrode, wherein the sonotrode is inserted into the weld pool to direct the ultrasonic energy into the weld pool at the junction.

5. The apparatus of claim 3, further comprising the ultrasonic transducer having a sonotrode, wherein the sonotrode is in physical contact with one of the first member or the second member in proximity to the weld pool to direct the ultrasonic energy thereto.

6. The apparatus of claim 1, wherein the first pole and the second pole of the electro-magnetic transducer are arranged to apply an electro-magnetic field perpendicular to the junction and adjacent to the weld pool.

7. The apparatus of claim 6, wherein the first pole of the electro-magnetic transducer is proximal to the first member and adjacent to the weld pool, and wherein the second pole of the electro-magnetic transducer is proximal to the second member and adjacent to the weld pool.

8. The apparatus of claim 1, wherein the first pole and the second pole of the electro-magnetic transducer are arranged to apply an electro-magnetic field parallel to the junction and adjacent to the weld pool.

9. The apparatus of claim 8, wherein the first pole of the electro-magnetic transducer is proximal to a top portion of the first member and adjacent to the weld pool, and wherein the second pole of the electro-magnetic transducer is proximal to a bottom portion of the first member and adjacent to the weld pool.

10. The apparatus of claim 1, wherein the junction formed by the first member and the second member comprises one of a butt joint, a lap joint, a tee joint, a corner joint, or an edge joint.

11. The apparatus of claim 1, wherein the welding machine is configured to generate a seam weld at the junction of the first and second members.

12. The apparatus of claim 1, wherein the welding machine is configured to generate a spot weld at the junction of the first and second members.

13. The apparatus of claim 1, wherein the aluminum alloy including aluminum, zinc, and manganese comprises a 7000-series aluminum alloy.

* * * * *